UNITED STATES PATENT OFFICE.

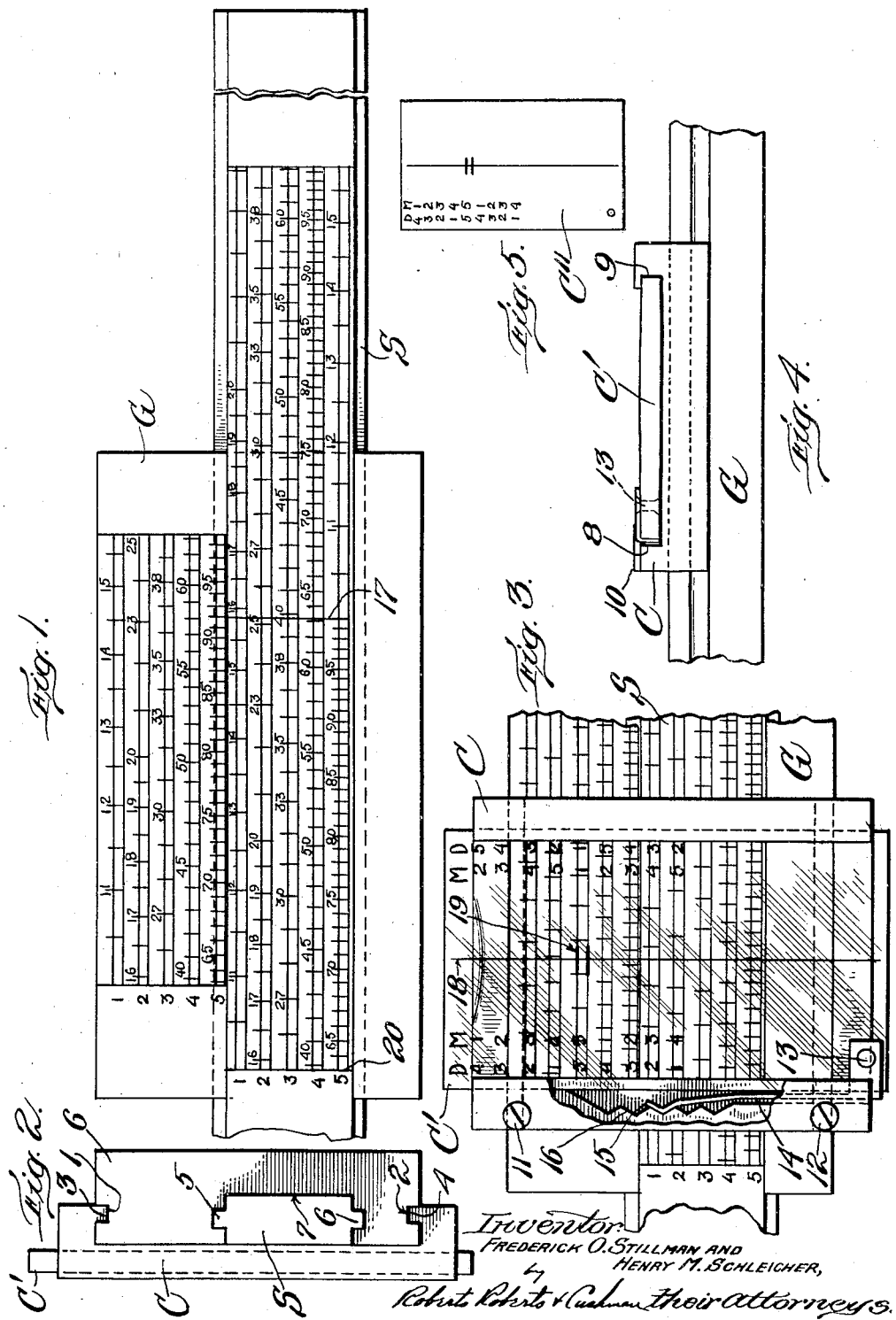

FREDERICK O. STILLMAN, OF MELROSE, AND HENRY M. SCHLEICHER, OF BOSTON, MASSACHUSETTS.

SLIDE-RULE.

1,364,154. Specification of Letters Patent. Patented Jan. 4, 1921.

Application filed October 23, 1919. Serial No. 332,686.

*To all whom it may concern:*

Be it known that we, FREDERICK O. STILLMAN and HENRY M. SCHLEICHER, citizens of the United States, and residents of Melrose, in the county of Middlesex and State of Massachusetts, and of Boston, in the county of Suffolk and said State, respectively, have invented new and useful Improvements in Slide-Rules, of which the following is a specification.

This invention relates to slide rules and more particularly to slide rules of the type disclosed in our prior Patent No. 1,250,379, granted December 18, 1917, in which the scales each comprises consecutive superposed portion of a continuous logarithmic scale.

Slide rules of the character referred to are far more accurate for a given length inasmuch as the divisions of the scale may be made as many times larger than usual as the number of portions into which each scale is divided. However, when each scale is divided into a number of superposed portions it is necessary to determine the portion of the scale in which the product of a process of multiplication or division may be found as well as to locate the point in that portion where the product is located. The principal object of the present invention is to facilitate the location of the portion of a divided scale in which the product may be found.

Other objects of the invention will be apparent from the following description and the accompanying drawings in which—

Figure 1 is a plan view of the preferred embodiment of the invention, parts being removed and parts being broken away;

Fig. 2 is an end elevation of the device completely assembled;

Fig. 3 is a view similar to Fig. 1 showing the parts completely assembled and showing parts broken away;

Fig. 4 is a side elevation of the device parts being broken away; and

Fig. 5 is a detail view of a modified part of the device.

The preferred embodiment of the invention illustrated in the drawings comprises a guide member G, a slide member S, a longitudinally movable cursor C, and a transversely movable cursor C'. The guide member G has grooves 1 and 2 formed in its opposite sides and the cursor C has flanges 3 and 4 adapted to slide in the grooves 1 and 2 so that the cursor C may slide longitudinally of the guide G. The slide member S has tongues 5 and 6 on its opposite sides adapted to slide in grooves in the opposite sides of the channel 7 which is formed in the guide member to receive the slide member. The transversely movable cursor C' preferably comprises a plate of glass adapted to slide transversely in channels 8 and 9 formed in the opposite sides of the cursor C. The cursor C is provided with a detachable plate 10 overhanging the channel 8 at one side, this plate being detachably held in place by screws 11 and 12, whereby the cursor C' may be removed from the cursor C by detaching the plate 10. Mounted at one corner of the cursor C' by means of a rivet 13 is a spring finger 14 having a V-shaped catch 15 on its free end adapted to coöperate with V-shaped notches 16 in the cursor C.

As in our aforesaid patent the scales on the guide and slide members respectively comprise consecutive superposed registering portions of a continuous scale instead of a logarithmic scale formed continuously in a single line as in the ordinary slide rule. Thus in the drawings the scale on the guide member is divided into five portions (although it is to be understood that the scale may be divided into any desired number of portions) the five portions being numbered (or otherwise designated with letters or other characters or indicia) consecutively from top to bottom at the left-hand end of the scale. The five portions taken together form a complete logarithmic scale and each succeeding portion begins where the preceding portion terminates. Thus portion 1 terminates approximately at 1585 and the second portion begins approximately at 1585; similarly portion 2 terminates approximately at 2512 and portion 3 begins approximately at 2512, etc. The five portions are equal in length so that when superposed they register at their opposite ends with each other.

As illustrated in the drawings the slide member is provided with two scales each comprising five superposed registering portions of a continuous logarithmetic scale similar to the scale on the guide member, the two scales being placed end to end so as to join at the line 17 in Fig. 1. The scale to the left of line 17 is an exact duplicate of the scale on the guide member, but the scale on the right of line 17 differs from the scale on the guide member in that the portions are differently arranged. The second portion is placed at the top in alinement with the first portion of the left-hand scale, the third, fourth and fifth portions are placed in alinement with the second, third and fourth portions of the left-hand scale and the first portion is placed in alinement with the last portion of the left-hand scale.

On the transversely movable cursor C' is provided a transverse registering line 18 and two longitudinal registering lines 19, the transverse line 18 being adapted to register a point in the slide scale with a point in the guide scale and the longitudinal lines 19 being adapted to register with any one of the five portions of the scale on the guide member.

At the left-hand side of the cursor C' is provided two series of numbers designated M and D respectively, the series M being arranged to be used in multiplication processes and the series D being arranged to be used in division processes. The numbers in each series are arranged consecutively; and they are spaced apart transversely of the guide scale so as to register with the respective portions of the scale when the longitudinal lines 19 are in registry with any one of the five portions of the scale. The numbers correspond to the numbers of the portions of the slide scale and are arranged in sequence. Thus in series M the numbers progress from top to bottom beginning with 1 and continuing to 5, then beginning again with 1 and continuing to 4, the last four numbers being repeated so that there will be a number in registry with each portion of the guide scale when the longitudinal lines 19 are in registry with any one of the five portions of the scale. Thus when the longitudinal lines 19 are in registry with the fifth portion of the guide scale the first five numbers of series M will register respectively with the portions of the guide scale bearing the same numbers, while when the longitudinal lines 19 are in registry with the first portion of the guide scale the last five numbers of series M will register with the respective portions of the scale. The series D is similar to the series M but the numbers progress in the opposite direction, the D series beginning at the bottom with 1 instead of at the top and ending with 4 at the top instead of at the bottom.

At the right-hand side of the cursor C' two similar series of numbers are provided for multiplication and division respectively, these two series differing from the two series at the left-hand side only in that the numbers in each series are shifted in the direction opposite to the direction in which the sequence progresses distances equal to the distance between two portions on the guide scale. Thus the numbers in the right-hand series M are shifted upwardly one space each with respect to the numbers in the left-hand series M and the numbers in the right-hand series D are shifted downwardly one space each with respect to the numbers in the left-hand series D. Thus it will be observed that in the two left-hand series the numbers 5 are in alinement with the longitudinal lines 19 while in the two right-hand series the numbers 1 are in alinement with the lines 19. As will hereinafter appear the two left-hand series of numbers M and D are arranged to be used in multiplication and division respectively when the slide extends to the left from the guide, and the two right-hand series are arranged to be used respectively for multiplication and division when the slide extends to the right from the guide.

In using our improved slide rule either one or both of the scales on the slide may be used, and when both of the scales on the slide are being used the two series of numbers M and D at one side of the cursor C' may be omitted. Thus in Fig. 5 we have illustrated a modified cursor C" in which only the two left-hand series of numbers are provided.

When using only one scale on the slide the operation is as follows:

Multiplication: Taking as an example the process of multiplying the two factors 2 and 3 to obtain the product 6 the procedure is, first, set the transverse line 18 on 2 on the guide scale, 2 being found in the second portion of the scale; secondly, set the longitudinal lines 19 on the portion 2 of the guide scale containing the factor 2; thirdly, bring the left index 20 of the slide scale into registry with the transverse line 18 (assuming that the slide is provided only with the left-hand scale); fourthly, bring the transverse line 18 to the factor 3 in the slide scale, which will be found in portion 3; fifthly, note the number of the portion of the slide scale containing the factor 3, number 3 in this example; sixthly, find the product 6 in the guide scale in the portion which is in registry with the number 3 in the right-hand series M, 3 being the number of the slide scale containing the second factor 3. The right-hand series M is employed in this case instead of the left-hand series M for the reason that the slide scale in this particular example extends from the right-hand end of the guide scale. When the slide extends to the left, the left-hand series M is employed.

Division: Taking for example the process of dividing the factor 6 by the factor 2, to obtain the product 3 the procedure is, first, set the transverse line 18 on factor 6 of the guide scale, which is found in portion 4; secondly, set the longitudinal lines 19 on the portion 4 of the guide scale containing the factor 6; thirdly, bring the factor 2 in the slide scale which is found in portion 2, under the transverse line 18; fourthly, bring the transverse line 18 to the left-hand index 20 of the slide scale, this being the index which falls within the limits of the guide scale; fifthly, note the number 2 of the portion of the slide scale containing the factor 2; and sixthly, find the product in the portion of the guide scale which is in registry with the number 2 in the right-hand series D, the right-hand series D being used owing to the fact that the slide projects to the right. When the slide projects to the left the left-hand series D is used instead of the right-hand series.

When using both of the slide scales the operation is as follows:

Multiplication: Considering for example the process of multiplying the factors 2 and 3 to obtain the product 6 the procedure is, first, set the transverse line 18 on 2 in portion 2 of the guide scale; secondly, set longitudinal lines 19 on portion 2 of the guide scale containing factor 2; thirdly, bring center index 17 of the slide to the transverse line 18; fourthly, bring the transverse line 18 to the second factor 3 in the third portion of the right-hand slide scale, this being the scale in which factor 3 falls within the limits of the guide scale; fifthly, note the number 2 of the slide scale containing the factor 3; and sixthly, find the answer under the transverse line 18 in the portion of the guide scale in registry with the number 2 in the left-hand series M, the product being found in portion 4 of the guide scale in this example.

Division: Taking for example the process of dividing the factor 6 by the factor 2 to obtain the product 3 the procedure is, first, set the transverse line 18 on factor 6 in the guide scale; secondly, set the longitudinal lines 19 on portion 4 of the guide scale containing factor 6; thirdly, bring the factor 2 in the right-hand slide scale under the transverse line 18, the right-hand slide scale being selected rather than the left-hand slide scale owing to the fact that it will bring the center index 17 within the limits of the guide scale; fourthly, bring the transverse line 18 to the slide index 17; fifthly, note the number 1 of the portion of the slide scale containing the factor 2; and sixthly, find the answer in that portion of the guide scale which is in registry with the number 1 in the left-hand series D.

By employing the two scales on the slide scale and by using the central index 17 exclusively the operator needs to pay no attention to the direction in which the slide scale projects from the guide scale, and as stated above only the two left-hand series of numbers are employed as illustrated in Fig. 5.

The spring finger 14 and notches 16 are so arranged that when the cursor C' is brought into approximate registry with any one of the portions of the guide scale the elasticity of the spring 14 automatically brings the cursor into accurate registry and holds it there.

What we claim is:

1. In a slide rule of the type having a guide member and a slide member, each carrying a scale comprising consecutive superposed registering portions of a continuous logarithmic scale, a cursor arranged to be moved transversely of one scale into registry with any portion thereof, said cursor having indicia thereon arranged to register with the respective portions of said one scale when the cursor registers with any portion thereof, said numbers corresponding to the respective portions in the other scale and being so arranged that when the cursor is in registry with one factor in said one scale the indicia corresponding to the portion of said other scale containing the other factor is in registry with the portion of said one scale containing the product.

2. In a slide rule of the type having a guide member and a slide member, each carrying a scale comprising consecutive superposed registering portions of a continuous logarithmic scale, a cursor having a registering part arranged to be moved transversely of one scale into registry with the respective portions thereof, said cursor having characters thereon corresponding to the numbers of the respective portions of the other scale, said characters being arranged in sequence transversely of the cursor so as to register with the respective portions of said one scale in the various transverse positions thereof, and said sequence progressing in such direction that when the cursor is brought into registry with the portion of said one scale containing one factor the character corresponding to the portion of said other scale containing the other factor is in registry with the portion of said one scale containing the product.

3. In a slide rule of the type having a guide member and a slide member, each carrying a scale comprising consecutive superposed registering portions of a continuous logarithmic scale, a cursor having a registering part arranged to be moved transversely of one scale into registry with the respective portions thereof, said cursor having numbers thereon corresponding to the numbers of the respective portions of the other scale, said numbers being arranged in sequence transversely of the cursor so as to register with the respective portions of said one scale in the various transverse positions thereof, and said sequence progressing in the same direction as the numbers of the portions of said other scale, whereby in multiplication when one number is brought into registry with the portion of said one scale containing one factor the number corresponding to the portion of said other scale containing the other factor is in registry with the portion of said one scale containing the product.

4. In a slide rule of the type having a guide member and a slide member, each carrying a scale comprising consecutive superposed registering portions of a continuous logarithmic scale, a cursor arranged to be moved transversely of one scale into registry with the respective portions thereof, said cursor having two series of numbers arranged transversely thereon so that the numbers of each series will register with the respective portions of said one scale in the various positions thereof, the numbers in each series corresponding to the numbers of the respective portions of the other scale and being arranged in sequence, and the sequence of the two series progressing in opposite directions so that in multiplication the numbers of one series indicate the scale portion containing the product and in division the numbers of the other series indicate the scale portion containing the product, substantially as described.

5. In a slide rule of the type having a guide member and a slide member, each carrying a scale comprising consecutive superposed registering portions of a continuous logarithmic scale, a cursor arranged to be moved transversely of one scale into registry with the respective portions thereof, said cursor having two series of numbers arranged transversely thereon so that the numbers of each series will register with the respective portions of said one scale in the various positions thereof, the numbers in each series corresponding to the numbers of the respective portions of the other scale and being arranged in sequence, and the numbers in one series being shifted transversely of the cursor distances respectively equal to the distance between two adjacent portions of said one scale, whereby the numbers of one series indicate the scale portion containing the product when said slide projects in one direction from said guide and the numbers of the other series indicate the scale portion containing the product when the slide projects in the other direction.

6. A slide rule adapted to indicate the product of two factors comprising a guide member, a slide member, a scale on one of said members comprising consecutive superosed registering portions of a continuous logarithmic scale, and two scales on the other of said members each comprising consecutive superposed registering portions of a continuous logarithmic scale, said last two scales being placed end to end and each being equal in length to said first scale, and the portions of one of said last two scales being transversely shifted relatively to the portions of the other of said last two scales distances respectively equal to the distance between two adjacent portions of the two scales.

7. A slide rule adapted to indicate the product of two factors comprising a guide member, a slide member, a scale on one of said members comprising consecutive superposed registering portions of a continuous logarithmic scale, and two scales on the other of said members each comprising consecutive superposed registering portions of a continuous logarithmic scale, said last two scales being placed end to end and each being equal in length to said first scale, the portions of one of said last two scales being transversely shifted relatively to the portions of the other of said last two scales distances respectively equal to the distance between two adjacent portions of the two scales and the first portion of one of said last two portions and the last portion of the other of said last two scales being placed in alinement.

Signed by us at Boston, Massachusetts, this 20th day of October, 1919.

FREDERICK O. STILLMAN.
HENRY M. SCHLEICHER.